RADIO FREQUENCY RESONANT CIRCUIT COMPONENT

Original Filed March 22, 1965

United States Patent Office 3,403,359
Patented Sept. 24, 1968

3,403,359
RADIO FREQUENCY RESONANT CIRCUIT COMPONENT

Joshua George Dowell Manwaring, Needham, Mass., assignor to Radio Frequency Company Inc., Medfield, Mass., a corporation of Massachusetts Continuation-in-part of applications Ser. No. 128,326, July 18, 1961, now Patent No. 3,095,548, and Ser. No. 362,471, Apr. 24, 1964; continuation-in-part and division of application Ser. No. 441,564, Mar. 22, 1965. This application July 28, 1966, Ser. No. 568,486
The portion of the term of the patent subsequent to June 25, 1980, has been disclaimed
8 Claims. (Cl. 333—76)

This invention relates to radio frequency circuitry and components, and is a continuation-in-part of my U.S. applications, Ser. No. 128,326, filed July 18, 1961; Ser. No. 362,471, filed Apr. 24, 1964; and Ser. No. 441,564, filed Mar. 22, 1965, as well as being a division of the latter application. More particularly, the present invention relates to improvements in the novel resonant circuit component having lumped capacitance and inductance and its circuitry as described in said earlier applications and dominated in some respects by certain of the claims thereof, although not specifically shown and described therein.

In said earlier application, Ser. No. 128,326, the circuit components specifically shown and described were of a type having slot means effective to establish desired current paths. According to the present invention, however, a unique component configuration is provided wherein such slot means may be eliminated, the desired current paths nevertheless being established. This is accomplished by connecting together with opposed plates of a pair between a point on each of the plates remotely spaced from one another in a transverse direction along the plane of the plates to provide an inductive loop or coil therebetween, rather than connecting the plates at adjacent points as is described in said earlier application. The arrangement of the present invention has a substantial advantage, in that it makes possible the provision of a shielded component simply by mounting the opposed plates on opposite side walls of a box-like enclosure.

In addition to a novel component, the present invention is also concerned with novel means and circuitry for coupling to a load the circuit components described and shown in both the present and earlier application.

For the purpose of describing in more detail the various objects and features of the present invention, reference is now made to the following detailed description of preferred embodiments thereof, together with the accompanying drawings, wherein.

Figure 1:
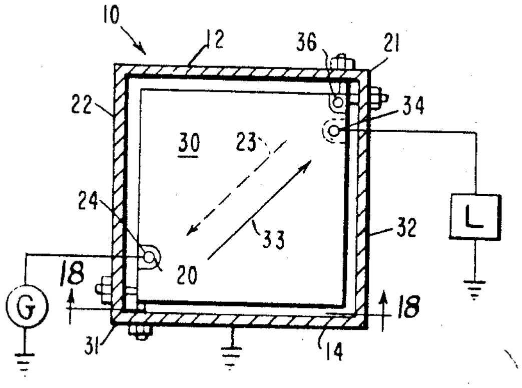
FIG. 1 is a sectional plan view of a shielded embodiment of the invention together with a diagrammatic showing of its circuitry.

Before discussing in detail the specific configurations shown in the drawings of the lumped constant stacked plate resonant circuit component of the present invention, it should be pointed out that each of them consists of one or more parallel pairs of closely conductive plates, connected together, with the plates cooperating to provide a capacitance and with their common connection a pair of mutually coupled inductances having their junction at the common connection point. The latter requires that current paths are defined in the plates such that lines of flux from one inductance link with those of the other to provide inductive coupling between them, whereby mutual inductance exists between them. This requires that the current paths defined in the plates to be such that spaced paths be provided for circulating radio frequency currents in opposite directions of the plates. This does not mean that such defined current paths may not cross one another, as to provide a current path in the form of a twisted loop having one or more current path crossings. Nor does it mean that some current paths within the plates may not be inconsistent with this requirement—it is the overall effect of the current paths in establishing the required mutual inductance that is important to the circuit component of the invention.

To this general concept described in the above mentioned co-pending applications, the present invention adds the concept that the plates may be connected between remote transversely spaced, rather than adjacent points, both to provide the desired current paths and an inductive loop or coil. Preferably they may have their other, high energy, connections remotely spaced from one another in a transverse direction parallel to the plane of the plates as well, not only to provide opposite current paths in the pair of plates spaced from one another by the spacing of the plates themselves, but also spaced in a transverse direction parallel to the plane of the plates.

With multiple pairs of plates the same requirement of mutual inductance is required, so that in an assembly of a plurality of plates, the individual plates may be said to alternate. The pairs are always in the same relationship to one another and do not alternatively aid and oppose, for example. The use of multiple pairs is particularly advantageous, not only to enable the provision of a component having the smallest and most convenient size possible, as may be achieved by using a cubical assembly of stacked plates, but, even more important, because of the adding together of the capacitances of the pairs of plates while at the same time reducing their inductance value. This provides a resonant circuit having a uniquely high capacitance relative to its inductance, and one which is hence relatively immune to instability due to variations in the capacitive reactance of a load coupled thereto. It also adds in the establishment of a high "Q" factor as is especially important in resonant tank circuits operating at powers of several kilowatts.

The novel stacked plate resonant circuit component of the invention, regardless of plate shape, is excited by means of a suitable radio frequency power source connected between the common plate connection point, normally considered as an R.F. ground point, and some other point, which may be referred to for convenience as a high energy point, on one plate only of a pair remote from the common point, with the current path between such two points defining one of the two series connected inductances provided by the pair of plates. The corresponding high energy point on the other plate of the pair is, then, connected to the radio frequency power source only by means of the mutual inductance and capacity of the plates, so that current flow in such other plate occurs only by induction due to current flow in the plate to which the source is connected. The load may be either directly connected or otherwise coupled to the other plate at its high energy point, which may be referred to as its output, or it may be connected in the novel manner show in FIG. 3 herein and described in detail below. With an assembly of multiple pairs of plates, the common plate connection points, the power source connection points and the output points are each connected to corresponding points on each of the pairs of plates.

In general, the resonant circuit components of the present invention are useful over a frequency range of from a few megacycles to upwards of 100 megacycles for any purposes for which conventional resonant circuits are used. They may be coupled to any of the known radio frequency power sources, such as vacuum tubes, solid state devices or equivalents thereof and so may be used as radio frequency oscillators, or amplifiers, for example, in radio frequency heating apparatus, communications equipment and the like.

Figure 2:
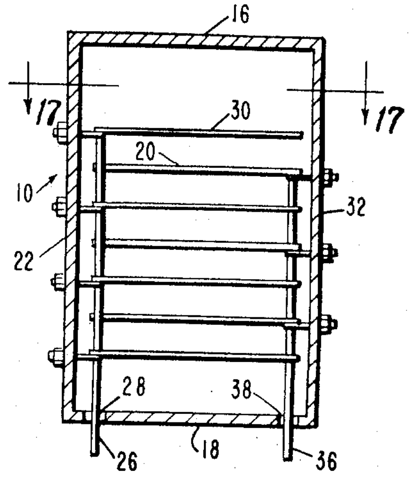
FIG. 2 is a sectional elevational view of the embodiment of FIG. 1.

In FIGS. 1 and 2 is shown a stacked plate resonant circuit within an enclosure according to the invention, the alternating plates of each pair being mounted on opposite side walls of enclosure 10. Each of the pairs of plates has an input plate 20 and an output plate 30, the series of input plates 20 being mounted on enclosure side wall corner 21 and the series of output plates 30 being mounted on opposite enclosure side wall corner 31, so that the plates are all electrically connected together through the enclosure side walls 22, 32, connecting walls 12, 14 and the end walls 16, 18. Input plate 20 has an input terminal 24 at a corner remote from the common connections at corner 21 and output plate 30 similarly has output air terminal 34. These terminals are preferably on opposite edges of the plates, remote from one another, and each series is connected together by input connecting rod 26 and output connecting rod 36 which rods are brought through the enclosure 10 by means of suitable openings 28, 30 which serve electrically to insulate the rods from the enclosure.

With the component assembled as shown with plates 20 alternating with plate 30, current paths of alternating configuration are defined in alternate plates, as is shown by the arrows 23, 33 in FIG. 1. The current paths provided, then, in any two successive paths are such that currents flowing in opposite directions are preferably transversely spaced from one another in the plane of the plates so that all of such plates will be inductively coupled to one another.

The above described component is shown connected in a circuit, wherein a radio frequency generator G is connected between input rod 26 and a suitable ground. A load L is connected between rod 36 and a suitable ground. Thus current can flow through the plates along a path (FIG. 1) in such a manner as to provide a pair of mutually coupled inductances, with the enclosure forming a part of an inductive loop or coil, and with the plates being capacitive coupled to one another.

Figure 3:
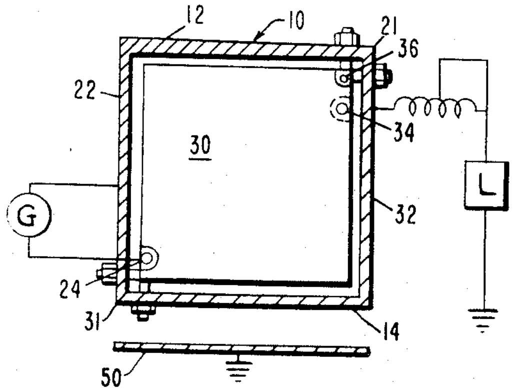
FIG. 3 is a sectional plan view like that of FIG. 1 but showing load circuitry modified from that of FIG. 1.

Another coupling arrangement is that shown in FIG. 3, wherein the radio frequency generator is connected between enclosure 10 and input rod 26, and the load L is connected, through a suitable coil, between enclosure 10 and a suitable ground. The enclosure 10 is not grounded in this coupling arrangement, but is provided with a plate 50 spaced therefrom parallel to one of the walls of enclosure 10 or to plates 20, 30, which plate is grounded to complete the circuit. Nor is the use of this unique coupling arrangement limited to the specific component of FIG. 3, but may be used as well with the components shown and described in said earlier application. In that case, the radio frequency generator is connected between their common and input connections, the load connected between their common connections and ground, and a grounded plate provided adjacent preferably to the common connected ends and parallel thereto but spaced therefrom, although such a plate parallel to other edges or to the plates themselves might also be used.

Figure 4:
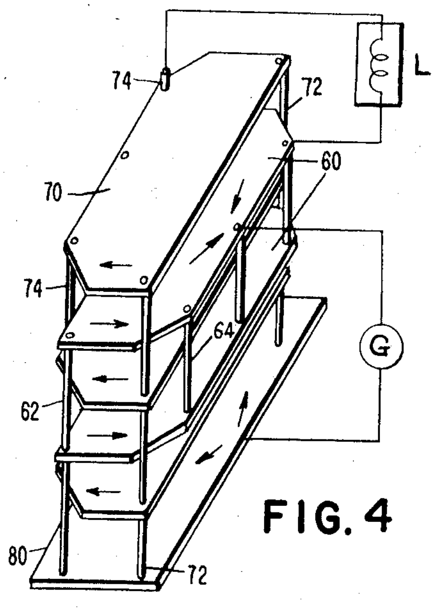
FIG. 4 is an isometric view of a modification of the component of FIGS. 1–3.

In FIG. 4 is shown a somewhat modified component in which the enclosure of the above described embodiment is, in large part omitted, so that but an inductive half loop connection remains. Thus, input plates 60 are connected at one side thereof by rods 62 and output plates 70 are connected at their opposite remote sides by rods 72, all of the rods 62, 72 being connected to a base plate 80, to provide a common connection. The opposite sides of said plates 60, 70 are connected together by rods 64, 74 respectively. Radio frequency generator G is connected between input connecting rods 64 of input plates 60, and load L such as a coil is connected between output connecting rods 74 of plates 70, although the connection of FIG. 3 may be used as well. Base plate 80 may be considered to be equivalent to a wall of enclosure 10, all the other walls being omitted without omitting the electrical connections provided thereby. A connection plate equivalent to plate 50 of FIG. 3 may be utilized therewith. Although the embodiment of FIG. 4 does not provide the desirable shielding of the component of FIGS. 1 and 2, it is nevertheless useful in many applications wherein such shielding is not needed.

Figure 5:
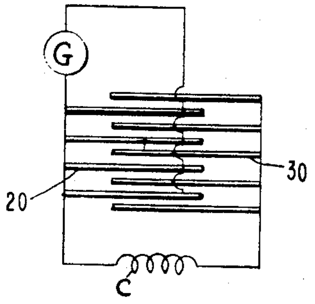
FIG. 5 is an electrical circuit diagram of the component of the invention.

FIG. 5 is a circuit diagram showing of the component of the present invention as above described, showing a coil C connected between the remote common connection points of the opposed plates, input plates 20 and output plates 30.

Although each of the above described resonant circuit components of the invention has been shown and described as a fixed tuner resonant circuit component, it is apparent that they may be made tunable over a range of frequencies. This may be accomplished by moving one of the plates of each of the pairs relatively to the other of the plates thereof, as by swinging one set relatively to the other much as in the manner of a conventional tunable capacitor. Thus, with the structure of FIGS. 1 and 2, plates 20 may be swung as a group relatively to plates 30 above their connections to wall 22. Alternatively, the spacing between the plates might be changed. It should be noted particularly with this arrangement that the forces and mechanical arrangement for swinging or otherwise moving alternate plates relatively to one another may be applied at an electrical ground point, so that radio frequency voltage problems do not arise in this regard.

Another tunable arrangement is shown in FIG. 4, wherein base plate 80 may be made movable toward and away from adjacent output plate 70, by moving it along rods 62, 72, or the number of said rods may be increased or decreased.

To summarize, the paired plate configuration of the invention defines radio frequency current paths in opposite directions and preferably in transversely spaced paths to provide a pair of connected inductors having a low energy point at the connection and two high energy points remote therefrom generally at the other end of the plates from the connection therebetween. Thus, the low energy point is electrically halfway between the two high energy points, and each plate of a pair together with the common connection provides one half of the inductance of the radio frequency tank circuit, with the capacitance being provided between the plates of the pair. The radio frequency generator is connected across one plate only of the pair, so that with a conventional vacuum tube utilized as a radio frequency power generator, for example, the high voltage direct current path is along one plate only between its high energy point and the connection between the two plates. Preferably, the circuit is grounded both to D.C. and R.F. at the connection between the plates to aid in providing the electrical stability so important in high frequency circuitry. This latter aspect is also aided by the high C to L ratio made possible by the tank circuit component of the invention.

Thus, it will be seen that the invention provides novel resonant frequency circuits and components especially useful at high frequencies and high powers to provide high efficiency and stability at reasonable cost. Various modifications thereof, within the spirit of the invention and the scope of the appended claims, will be apparent to those skilled in the art.

I claim:

1. A radio frequency turned circuit component consisting of a conductive support having opposed, spaced, generally parallel support members electrically connected together and two series of alternating opposed solid conductive plates spaced from one another in a direction perpendicular to the plane of the plates for capacitive coupling therebetween, with the plates of each series mounted on opposite said members in the space between said support members, said support members of a pair being connected to a common plate, said series of plates being electrically connected together through said members providing an inductive loop, at least one of said series of plates having a common high energy connection point spaced from the connected said member of said series to provide a pair of mutually inductively coupled inductors providing radio frequency current flow in at least one high current density path in each of said plates with said flow in said opposed plates establishing a radio frequency field by current flow in opposite directions along said plates for mutual inductive coupling and the axis of said inductive loop being parallel to said plates.

2. A radio frequency tuned circuit component as claimed in claim 1, wherein radio frequency generator means is provided connected to said high energy point.

3. A radio frequency tuned circuit component as claimed in claim 1 wherein each of said series of plates have high energy connection points, with radio frequency generator means connected to one of said high energy points and load means connected to the other of said high energy points.

4. A radio frequency tuned circuit component as claimed in claim 1, further having base plate means spaced from said component.

5. A radio frequency tuned circuit component as claimed in claim 4, wherein load means is connected between said common connection and said base plate means.

6. A radio frequency tuned circuit component consisting of a conductive enclosure having opposite spaced, parallel wall support members and two series of alternating opposed conductive plates spaced from one another in a direction perpendicular to the plane of the plates for capacitive coupling therebetween with the plates of each series mounted on opposite wall members in the space between said members, said series of plates being electrically connected together through said wall members providing an inductive loop with at least one of said series of plates having a common connection point spaced from the connected wall member of said series to provide a pair of mutually inductively coupled inductors providing radio frequency current flow in at least one high current density path in each of said plates with said flow in said opposed plates establishing a radio frequency field by current flow in opposite directions along said plates for mutual inductive coupling.

7. A radio frequency tuned circuit component as claimed in claim 6, further having base plate means spaced from a wall of said enclosure and generally parallel thereto, and load means connected between said enclosure and said base plate means.

8. A radio frequency tuned circuit component having opposite spaced electrically-connected conductive support members and two series of alternating opposed solid conductive plates spaced from one another in a direction perpendicular to the plane of the plates for capacitive coupling therebetween with the plates of each series mounted on said opposite support members in the space between said members, said support members of a pair being connected to a common plate, said series of plates being electrically connected together through said support members providing an inductive loop with at least one of said series of plates having a common connection point spaced from the connected support member of said series to provide a pair of mutually inductively coupled inductors providing radio frequency current flow in at least one high current density path in each of said plates with said flow in said opposed plates establishing a radio frequency field by current flow in opposite directions along said plates for mutual inductive coupling and the axis of said inductive loop being parallel to said plates.

References Cited

UNITED STATES PATENTS

| | | | |
|---|---|---|---|
| 2,370,161 | 2/1945 | Hansen | 128—422 |
| 2,783,344 | 2/1957 | Warren | 219—19.55 |
| 1,955,093 | 4/1934 | Roosenstein | 333—83 |
| 3,095,548 | 6/1963 | Manwaring | 333—76 |

HERMAN KARL SAALBACH, *Primary Examiner.*

C. BARAFF, *Assistant Examiner.*